(12) United States Patent
Jennings et al.

(10) Patent No.: US 10,526,898 B2
(45) Date of Patent: Jan. 7, 2020

(54) AIRFOIL COOLING CIRCUIT

(71) Applicant: UNITED TECHNOLOGIES CORPORATION, Farmington, CT (US)

(72) Inventors: Timothy J. Jennings, West Hartford, CT (US); Carey Clum, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 377 days.

(21) Appl. No.: 15/791,784

(22) Filed: Oct. 24, 2017

(65) Prior Publication Data

US 2019/0120067 A1    Apr. 25, 2019

(51) Int. Cl.
*F01D 5/18* (2006.01)
*F01D 9/04* (2006.01)
*F01D 5/14* (2006.01)

(52) U.S. Cl.
CPC ............ *F01D 5/187* (2013.01); *F01D 5/147* (2013.01); *F01D 5/18* (2013.01); *F01D 5/186* (2013.01); *F01D 9/041* (2013.01); *F05D 2220/32* (2013.01); *F05D 2230/60* (2013.01); *F05D 2260/201* (2013.01); *F05D 2260/202* (2013.01); *F05D 2260/221* (2013.01)

(58) Field of Classification Search
None
See application file for complete search history.

(56) References Cited

U.S. PATENT DOCUMENTS

| 5,405,242 | A | * | 4/1995 | Auxier | B23P 15/04 |
| | | | | | 415/115 |
| 5,720,431 | A | * | 2/1998 | Sellers | F01D 5/186 |
| | | | | | 416/97 R |
| 5,931,638 | A | * | 8/1999 | Krause | F01D 5/186 |
| | | | | | 415/115 |

(Continued)

FOREIGN PATENT DOCUMENTS

EP    2900961    8/2015

OTHER PUBLICATIONS

European Patent Office, European Search Report dated Feb. 21, 2019 in Application No. 18201749.1.

*Primary Examiner* — Michael Lebentritt
(74) *Attorney, Agent, or Firm* — Snell & Wilmer L.L.P.

(57) ABSTRACT

An airfoil may include an airfoil body that defines a central chamber, a skin chamber, and an impingement hole extending between the central chamber and the skin chamber. The central chamber may be in fluidic communication with the skin chamber via the impingement hole. In various embodiments, a first cross-sectional area of the impingement hole is greater than about 25% of a second cross-sectional area of the skin chamber. In various embodiments, the impingement hole is positioned and configured to deliver cooling circuit air to a predicted position of a hotspot on a surface of the airfoil. In various embodiments, the airfoil body further defines at least one structural hole formed from at least one structural core tie, wherein a first cross-sectional area of the impingement hole is at least twice a second cross-sectional area of the at least one structural hole.

17 Claims, 4 Drawing Sheets

(56) References Cited

U.S. PATENT DOCUMENTS

| | | | | |
|---|---|---|---|---|
| 6,379,118 B2* | 4/2002 | Lutum | ................... | F01D 5/186 416/97 R |
| 7,478,994 B2* | 1/2009 | Cunha | ...................... | F01D 5/18 416/97 R |
| 7,520,725 B1* | 4/2009 | Liang | ..................... | F01D 5/186 416/97 R |
| 7,556,476 B1* | 7/2009 | Liang | ..................... | F01D 5/188 415/115 |
| 7,837,441 B2* | 11/2010 | Spangler | ................ | F01D 5/186 415/115 |
| 7,857,589 B1* | 12/2010 | Liang | ..................... | F01D 5/187 416/97 R |
| 7,946,815 B2* | 5/2011 | Liang | ..................... | F01D 5/186 416/97 R |
| 8,011,888 B1* | 9/2011 | Liang | ..................... | F01D 5/187 416/92 |
| 8,297,927 B1* | 10/2012 | Liang | ..................... | F01D 5/186 416/97 R |
| 8,366,395 B1* | 2/2013 | Liang | ..................... | F01D 5/186 416/96 R |
| 8,398,370 B1* | 3/2013 | Liang | ..................... | F01D 5/187 416/97 R |
| 9,605,544 B2 | 3/2017 | Tibbott et al. | | |
| 2006/0222494 A1 | 10/2006 | Liang | | |
| 2008/0080979 A1* | 4/2008 | Brassfield | ............... | B22C 9/043 416/97 R |
| 2008/0135718 A1* | 6/2008 | Lee | .......................... | B22C 9/04 249/62 |
| 2010/0025001 A1* | 2/2010 | Lee | .......................... | B22C 7/02 164/23 |
| 2010/0232946 A1* | 9/2010 | Propheter-Hinckley | ..................... | F01D 5/189 415/177 |
| 2010/0247327 A1* | 9/2010 | Malecki | ................. | F01D 5/189 416/96 A |
| 2013/0315749 A1* | 11/2013 | Zhang | ..................... | F01D 5/20 416/97 R |
| 2014/0099183 A1* | 4/2014 | Morgan | .................... | F01D 5/18 415/1 |
| 2015/0040582 A1* | 2/2015 | Dong | ..................... | F01D 5/187 60/806 |
| 2015/0285082 A1* | 10/2015 | Szijarto | ................... | F01D 5/187 416/95 |
| 2015/0345304 A1 | 12/2015 | Mongillo | | |
| 2018/0045056 A1* | 2/2018 | Wiedenhoefer | ......... | F01D 5/186 |
| 2018/0347377 A1* | 12/2018 | Folbach | ............... | B22F 3/1055 |
| 2019/0032496 A1* | 1/2019 | Kester | .................... | F01D 5/189 |
| 2019/0078441 A1* | 3/2019 | Clum | ..................... | F01D 5/186 |

* cited by examiner

AIRFOIL COOLING CIRCUIT

FIELD

The present disclosure relates to airfoils such as rotor blades and/or stator vanes, and more specifically, to cooling circuits in airfoils.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Cooling air may be extracted from the compressor section and used to cool the gas path components. Cooled components may include, for example, rotating blades and stator vanes in the turbine section. One mechanism used to cool turbine airfoils includes utilizing internal cooling circuits and/or a baffle.

SUMMARY

In various embodiments, the present disclosure provides an airfoil that includes an airfoil body. The airfoil body may define a central chamber, a skin chamber, and an impingement hole extending between the central chamber and the skin chamber, wherein the central chamber is in fluidic communication with the skin chamber via the impingement hole. In various embodiments, a first cross-sectional area of the impingement hole is greater than about 25% of a second cross-sectional area of the skin chamber.

In various embodiments, the second cross-sectional area is measured at a radial position where the impingement hole is located. In various embodiments, the second cross-sectional area is measured at a radial position that is between about 0% and about 10% of a radial span of the airfoil. In various embodiments, the first cross-sectional area of the impingement hole is between about 25% and about 75% of the second cross-sectional area of the skin chamber. In various embodiments, the first cross-sectional area of the impingement hole is greater than about 50% of the second cross-sectional area of the skin chamber. In various embodiments, the first cross-sectional area of the impingement hole is between about 50% and about 75% of the second cross-sectional area of the skin chamber. In various embodiments, the first cross-sectional area of the impingement hole is at least twice a third cross-sectional area of a structural hole, as described in greater detail below.

In various embodiments, the impingement hole is a first impingement hole and the airfoil body further defines a second impingement hole, wherein an alignment line extending between the first impingement hole and the second impingement hole is perpendicular to a flow direction of cooling circuit air configured to flow through the skin chamber. In various embodiments, a cumulative cross-sectional area of the first and second impingement holes is greater than about 25% of a second cross-sectional area of the skin chamber.

In various embodiments, the skin chamber is a first skin chamber and the impingement hole is a first impingement hole, wherein the airfoil body further defines, a second skin chamber axially adjacent the first skin chamber, and a second impingement hole extending between the central chamber and the second skin chamber. The central chamber may be in fluidic communication with the second skin chamber via the second impingement hole. In various embodiments, the first impingement hole and the second impingement hole are positioned at different radial positions.

In various embodiments, the impingement hole is positioned and configured to deliver cooling circuit air to a predicted position of a hotspot on a surface of the airfoil. In various embodiments, the airfoil body further defines at least one structural hole formed from at least one structural core tie, wherein a first cross-sectional area of the impingement hole is at least twice a second cross-sectional area of the at least one structural hole.

Also provided herein, according to various embodiments, is a method of manufacturing an airfoil. The method may include determining a predicted position of a hotspot on a surface of the airfoil and interconnecting a skin core with a central core via an impingement core tie to define an impingement hole configured to direct cooling circuit air at the predicted position. The method may further include interconnecting the skin core with the central core via at least one structural core tie.

In various embodiments, a first cross-sectional area of the impingement core tie is at least twice a second cross-sectional area of the at least one structural core tie. In various embodiments, an impingement cross-sectional area of the impingement core tie is greater than about 25% of a cross-sectional area of the skin core. In various embodiments, the impingement cross-sectional area of the impingement core tie is greater than about 50% of the cross-sectional area of the skin core.

The foregoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, a cooling circuit configuration for an airfoil is disclosed herein. Generally, the present disclosure provides impingement cooling to one or more skin chambers of a hybrid airfoil via impingement cooling from a central chamber, according to various embodiments. In various embodiments, and as described in greater detail below, cooling circuit air may be configured to flow out from one or more central chambers via one or more impingement holes to provide impingement cooling to a hot wall (e.g., an external wall) of a skin chamber. That is, for example, in addition to the flow of cooling circuit air through the skin chamber, the impingement hole(s) described herein provide supplemental, localized, impingement cooling to the airfoil. In various embodiments, the position of the impingement hole(s) are dependent on predicted positions of hotspots on the airfoil. This configuration may improve the ability, capacity, and/or efficiency of cooling the airfoil. While numerous details are included herein pertaining to airfoils in gas turbine engines, such as rotor blades and stator vanes, the scope of the present disclosure is not necessarily limited to airfoils of gas turbine engines. That is, the cooling circuit configuration provided herein may be utilized with internally cooled components in other applications.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that the first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component. Said differently, the term "axial" generally refers to a position along the "z" axis of the xyz axes provided in the figures (e.g., along the longitudinal center of the gas turbine engine).

As used herein, a first component that is "radially outward" of a second component means that the first component is positioned at a greater distance away from an axis, such as an axis of rotation for rotors (e.g., an engine central longitudinal axis of a gas turbine engine), than the second component. Correspondingly, a first component that is "radially inward" of a second component means that the first component is positioned closer to the axis, such as the axis of rotation (e.g., the engine central longitudinal axis of a gas turbine), than the second component. In the case of components that rotate circumferentially about the engine central longitudinal axis, a first component that is radially inward of a second component rotates through a circumferentially shorter path than the second component. Said differently, the term "radial" generally refers to a position along the "y" axis of the xyz axes provided in the figures.

Figure 1:
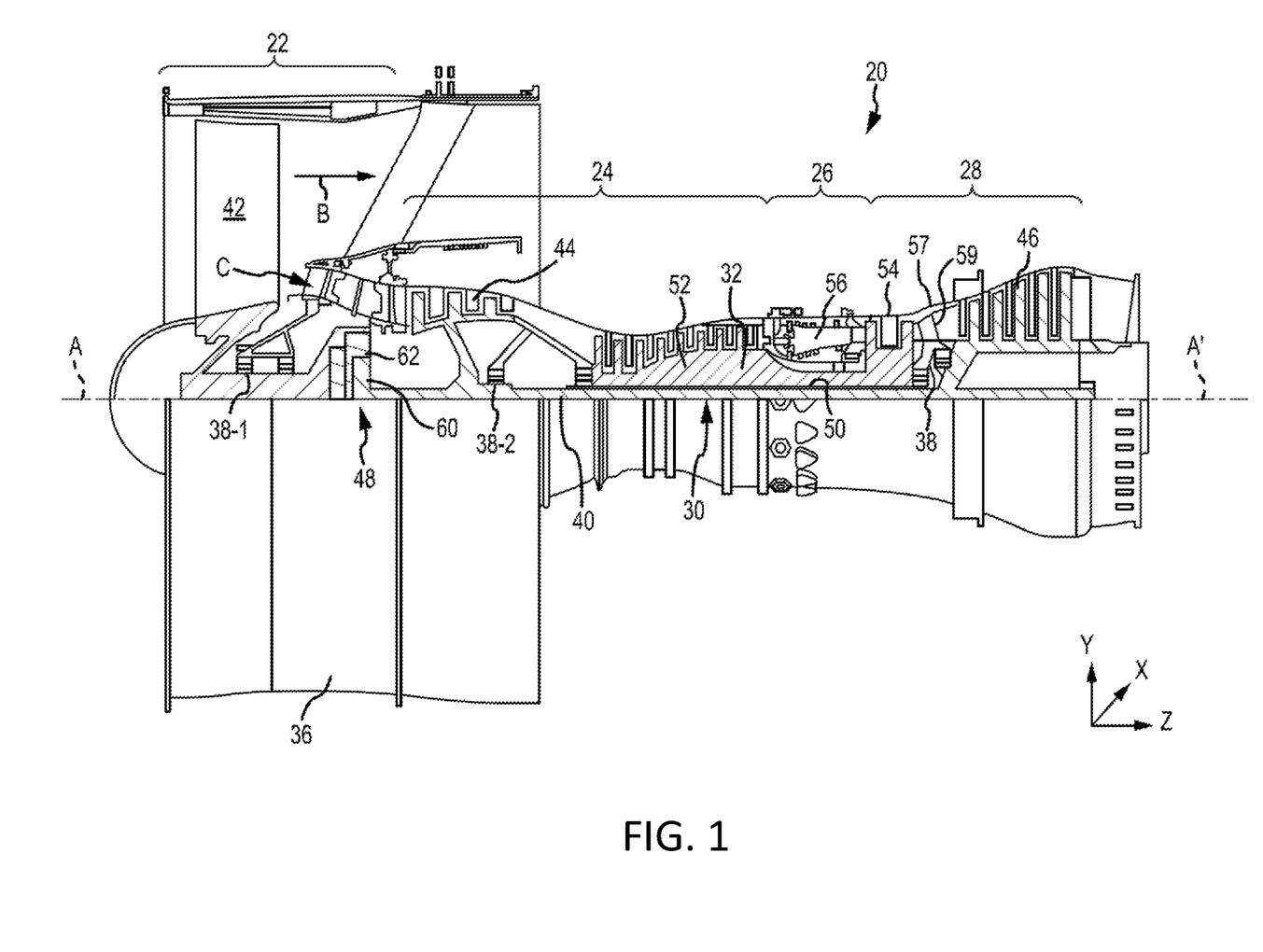
FIG. 1 is a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction (axial direction) on the provided xyz axis. The y direction on the provided xyz axis refers to radial directions. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 and then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
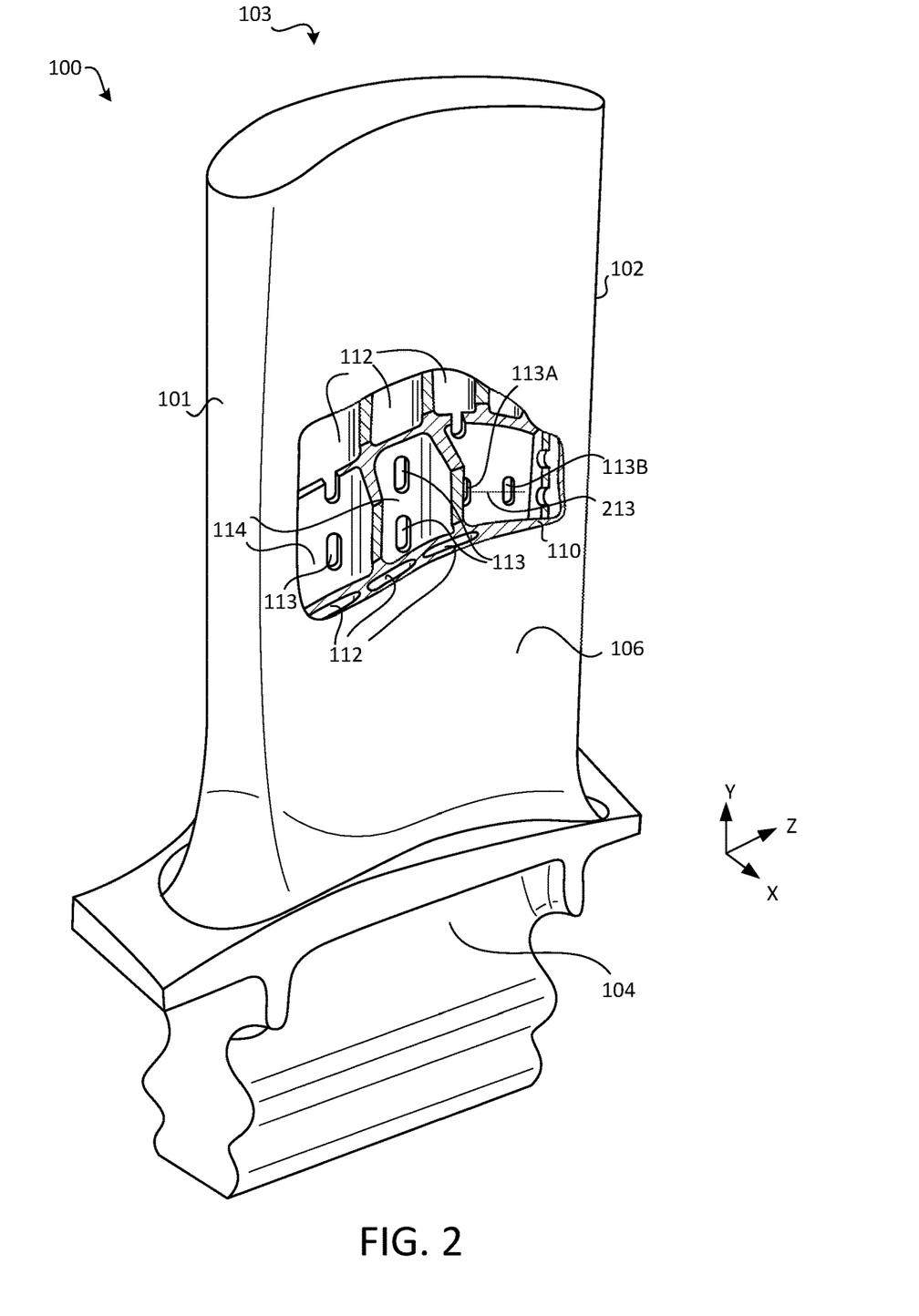
FIG. 2 is a perspective, partial cutaway view of an airfoil, in accordance with various embodiments.
Figure 3:
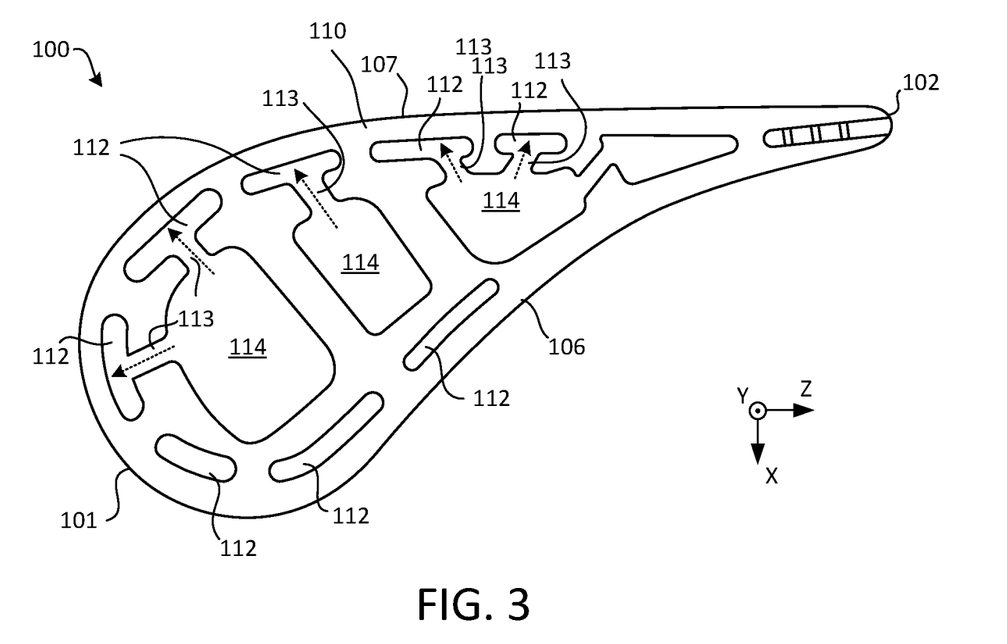
FIG. 3 is a cross-sectional view of an airfoil, in accordance with various embodiments.

Airfoils, such as rotor blades and stator vanes, are often utilized in various sections of gas turbine engines to direct, condition, and affect the flow of fluids (e.g., air and/or combustion gases) through the gas turbine engine. With reference to FIGS. 2 and 3, an airfoil 100 having an airfoil body 110 is disclosed. The airfoil 100 generally includes a hub end 104 for attaching the airfoil 100, for example, to a disk of a rotor system. The airfoil 100 may also have a radially outer edge or tip 103 located radially outward from the hub end 104. The airfoil 100 may have a leading edge 101 opposite a trailing edge 102. In various embodiments, the airfoil 100 may further include a generally concave pressure surface 106 and a generally convex suction 107 surface joined together at the respective leading edge 101 and trailing edge 102. The airfoil 100 may be curved and twisted relative to, for example, a plane extending radially from the rotor disk, in terms of the overall geometry of the airfoil 100.

It will be noted that airfoils for gas turbine engines may be provided in a variety of sizes, shapes, and geometries. Accordingly, the airfoil 100 of the present disclosure is not limited to the specific geometry, size, and shape shown in the figures. Further, as mentioned above, the disclosed airfoil 100 is not necessarily limited to the fan section 22 of a gas turbine engine 20, but instead may be implemented in other sections of the gas turbine engine 20 and/or may be adapted for use in other types of jet engines, propellers, rotors, etc. In various embodiments, the body 110 of the airfoil 100 may be fabricated from a metallic material, such as a metal and/or a metal alloy. In various embodiments, for example, the body 110 of the airfoil 100 may be fabricated from aluminum, an aluminum alloy, titanium, and/or a titanium alloy, among other suitable metallic materials. Additional details pertaining to the materials and methods of manufacture of the airfoil 100 are included below with reference to FIG. 4.

In various embodiments, the airfoil body 110 generally includes the structure, ribs, and/or walls that direct the cooling airflow through the airfoil 100. Thus, the airfoil body 110 generally includes the material that defines the chambers and flow passages that constitute the cooling circuit. In various embodiments, and with reference to FIGS. 2 and 3, the airfoil 100 is a hybrid airfoil that includes one or more skin chambers 112 and one or more embedded, central chambers 114. That is, the airfoil body 110 may include an external wall structure and an internal wall structure. Generally, the external wall structure includes the portions, segments, and/or sections of the airfoil body 110 that are adjacent to the external airfoil surface while the internal wall structure generally includes the portions, segments, and/or sections of the airfoil body 110 that are disposed within and extend between the external wall structure, according to various embodiments. Said differently, the external wall structure may be referred to as hot-side walls and/or hot-side surfaces because the external wall structure is adjacent to, and may directly abut, the external airfoil surface and thus may be closer to the high temperature combustion gases passing over and around the airfoil 100. The internal wall structure may be referred to as cool-side walls and/or cool-side surfaces because the internal wall structure is nearer to the center of airfoil 100 than the external wall structure and thus is further removed from the hot combustion gases.

In various embodiments, and with continued reference to FIGS. 2 and 3, the skin chambers 112 refer to the flow passages that are at least partially defined/formed by the external wall structure while the central chamber(s) 114 may be entirely defined by the internal wall structure and thus may not be defined by the external wall structure. In various embodiments, skin chambers 112 may be disposed around the central chamber(s) 114. Accordingly, the sections of the internal wall structure that define the central chamber(s) 114 may be cool-side walls that are not adjacent the external airfoil surface and thus do not interface with the hot combustion gases under nominal operating conditions. In various embodiments, the airfoil body 110 includes heat transfer augmentation features that are configured to improve convective heat transfer and thus improve the cooling ability of the cooling circuit air flowing within the flow passages. The heat transfer augmentation features may include an array of trip strips, protrusions, dimples, recesses, turbulators, pin fins, pedestals, and other suitable cooling features. In various embodiments, the airfoil body 110 may include film holes. The film holes may be configured to produce a layer of cooling air that flows over the surface(s) of the airfoil 100 to protect the airfoil from exposure to the high temperature combustion gases.

The airfoil body 110 may define various types of skin chambers 112 depending on their relative position within the airfoil. For example, the airfoil body 110 may define suction side skin chambers, leading edge skin chambers, and pressure side skin chambers. As mentioned above, the airfoil body 110 may also define one or more impingement holes 113 extending between the central chamber(s) 114 and the skin chamber 112. That is, the impingement hole(s) 113 may be defined in the inner wall structure of the airfoil body 110. The central chamber 114 may be in fluidic communication with the skin chamber 112 via the impingement hole 113. Said differently, the impingement hole may be configured to direct impingement cooling circuit air (indicated by the arrows in FIG. 3) into the skin chamber 112 from the central chamber 114. This impingement cooling circuit air may be in addition to the circuit cooling air that is configured to flow longitudinally (e.g., radially) through the skin chamber 112. In various embodiments, the localized, impingement cooling circuit air flows perpendicular to the standard, longitudinally flowing cooling circuit air in the skin chamber 112. In various embodiments, the impingement cooling circuit air is configured to impact an external wall of the skin chamber (e.g., a hot-side wall) to provide supplemental cooling to a hotspot.

In various embodiments, the cross-sectional area of the impingement hole 113 is greater than about 25% of the cross-sectional area of the skin chamber 112. As used herein, the term "about" refers to plus or minus 5%. In various embodiments, the cross-sectional area of the skin chamber 112 is measured at a position (e.g., a radial position) where the impingement hole 113 is located. In various embodiments, cross-sectional area of the skin chamber 112 is measured at a radial position that is up to about 10% of the radial span of the airfoil 100. For example, the cross-sectional area of the impingement hole 113 may be compared to any cross-sectional area measurement of the skin chamber 112 taken between 0% span (i.e., portion of the skin chamber 112 closest to the hub end 104 of the airfoil) and up to about 10% of the entire radial span of the skin chamber 112 of the airfoil. In various embodiments, the cross-sectional area of the impingement hole 113 is between about 25% and about 75% of the cross-sectional area of the skin chamber 112. In various embodiments, the cross-sectional area of the impingement hole 113 is between about 50% and about 75% of the cross-sectional area of the skin chamber 112. In various embodiments, the cross-sectional area of the impingement hole 113 is greater than about 50% of the cross-sectional area of the skin chamber. In various embodiments, the defined impingement hole(s) 113 is in addition to one or more structural holes formed via structural core ties, as described in greater detail below with reference to FIG. 4. In various embodiments, the cross-sectional area of the impingement hole 113 is at least twice the cross-sectional area of the one or more structural holes.

In various embodiments, and with reference to FIG. 2, the airfoil body 110 may define a first impingement hole 113A and a second impingement hole 113B that are both open to and configured to deliver impingement cooling circuit air to the skin chamber 112. In various embodiments, an alignment line 213 extending between the first and second impingement holes 113A, 113B is perpendicular to the flow direction of cooling circuit air configured to flow longitudinally through the skin chamber 112. For example, for a radially extending skin chamber 112, the first and second impingement holes 113A, 113B may be axially offset from each other but may be at substantially the same radial position, and thus the alignment line 213 extending between the first and second impingement holes 113A, 113B is perpendicular to the flow direction of the cooling circuit air in the skin chamber 112, according to various embodiments. In various embodiments, the details above relating to the relative cross-sectional size of the impingement hole 113 applies cumulatively to implementations of multiple impingement holes open to a single skin chamber. In other words, a cumulative cross-sectional area of the first and second impingement holes 113A, 113B is greater than about 25% of the cross-sectional area of the skin chamber 112, according to various embodiments.

In various embodiments, the airfoil body 110 may define a first and a second skin chamber, with a first impingement hole extending between the central chamber 114 and the first skin chamber and a second impingement hole extending between the central chamber 114 and the second skin chamber. In various embodiments, the first and second skin chambers extend adjacent to each other (e.g., the first and second skin chambers extend radially and thus may be axially adjacent to each other). In various embodiments, the first and second impingement holes are at different radial positions.

Figure 4:
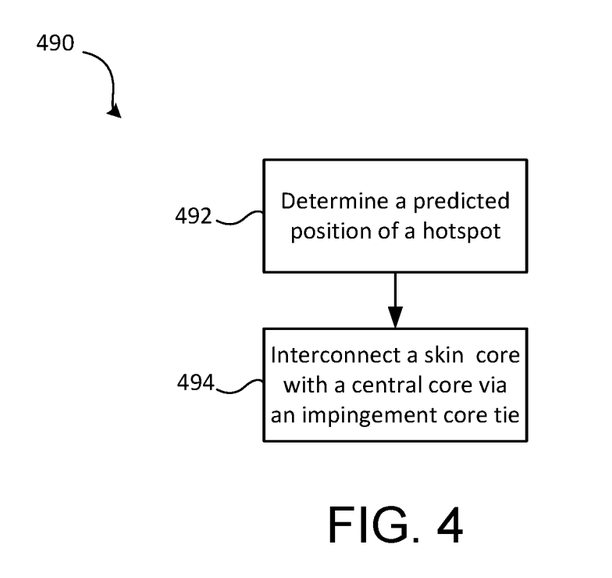
FIG. 4 is a schematic flow chart diagram of a method of manufacturing an airfoil, in accordance with various embodiments.

In various embodiments, and with reference to FIG. 4, a method 490 of manufacturing an airfoil is provided. The method 490 may include determining a predicted position of a hotspot on a surface of the airfoil at step 492 and interconnecting a skin core (which may be a material that occupied the negative space/volume of, for example, skin chamber 112) with a central core (which may be a material that occupied the negative space/volume of, for example, central chamber 114) at step 494. Interconnecting the skin core with the central core at step 494 may be performed using an impingement core tie (which may be a material that occupied the negative space/volume of, for example, impingement hole 113) to define an impingement hole configured to direct cooling circuit air at the predicted position (of the hotspot). In various embodiments, the airfoil body 110 of the airfoil 100 may be formed via a casting process, a core die technique, an additive manufacturing technique, a lost wax process, or an investment casting process, among other suitable processes.

In various embodiments, the method 490 further includes interconnecting the skin core with the central core via at least one structural core tie. For example, the method 490 may include interconnecting the skin core with a central core via one or more structural core ties. A structural core tie is a manufacturing artifact caused by a structure used to connect between the cooling channels during the casting process to join different casting structures together, reducing undesirable movement and part breakage during the manufacturing process. As mentioned above, the impingement core ties may be generally larger than standard, structural core ties. In various embodiments, a cross-sectional area of the impingement core tie is at least twice the cross-sectional area of the at least one structure core tie. In various embodiments, the impingement cross-sectional area of the impingement core is greater than about 25% of a cross-sectional area of the skin core. In various embodiments, the impingement cross-sectional area of the impingement core is greater than about 50% of a cross-sectional area of the skin core.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil comprising:
   an airfoil body, wherein the airfoil body defines:
   a central chamber;
   a skin chamber; and
   an impingement hole extending between the central chamber and the skin chamber, wherein the central chamber is in fluidic communication with the skin chamber via the impingement hole;
   wherein the airfoil body further defines at least one structural hole formed from at least one structural core tie, wherein a first cross-sectional area of the impingement hole is at least twice a second cross-sectional area of the at least one structural hole.

2. The airfoil of claim 1, wherein a first cross-sectional area of the impingement hole is greater than about 25% of a second cross-sectional area of the skin chamber.

3. The airfoil of claim 2, wherein the second cross-sectional area is measured at a radial position where the impingement hole is located.

4. The airfoil of claim 2, wherein the second cross-sectional area is measured at a radial position between about 0% and about 10% of a radial span of the airfoil.

5. The airfoil of claim 4, wherein the first cross-sectional area of the impingement hole is between about 25% and about 75% of the second cross-sectional area of the skin chamber.

6. The airfoil of claim 1, wherein the impingement hole is a first impingement hole and the airfoil body further defines a second impingement hole, wherein both the first impingement hole and the second impingement hole extend between the central chamber and the single skin chamber.

7. The airfoil of claim 6, wherein an alignment line extending between the first impingement hole and the second impingement hole is perpendicular to a radial flow direction of cooling circuit air configured to flow through the skin chamber.

8. The airfoil of claim 1, wherein the impingement hole is a first impingement hole and the airfoil body further defines a second impingement hole, wherein an alignment line extending between the first impingement hole and the second impingement hole is perpendicular to a radial flow direction of cooling circuit air configured to flow through the skin chamber.

9. The airfoil of claim 8, wherein a cumulative cross-sectional area of the first and second impingement holes is greater than about 25% of a second cross-sectional area of the skin chamber.

10. The airfoil of claim 1, wherein the skin chamber is a first skin chamber and the impingement hole is a first impingement hole, wherein the airfoil body further defines:
    a second skin chamber axially adjacent the first skin chamber; and
    a second impingement hole extending between the central chamber and the second skin chamber, wherein the central chamber is in fluidic communication with the second skin chamber via the second impingement hole;
    wherein the first impingement hole and the second impingement hole are positioned at different radial positions.

11. The airfoil of claim 1, wherein the impingement hole is positioned and configured to deliver cooling circuit air to a predicted position of a hotspot on a surface of the airfoil.

12. The airfoil of claim 1, wherein the skin chamber is configured to receive cooling circuit air that flows longitudinally through the skin chamber in addition to impingement air that flows through the impingement hole substantially perpendicular to the cooling circuit air.

13. A gas turbine engine comprising:
    an airfoil comprising an airfoil body, wherein the airfoil body defines:
    a central chamber;
    a skin chamber; and
    an impingement hole extending between the central chamber and the skin chamber, wherein the central chamber is in fluidic communication with the skin chamber via the impingement hole;
    wherein a first cross-sectional area of the impingement hole is greater than about 25% of a second cross-sectional area of the skin chamber; and wherein the airfoil body further defines at least one structural hole formed from at least one structural core tie, wherein the first cross-sectional area of the impingement hole is at least twice a third cross-sectional area of the at least one structural hole.

14. The gas turbine engine of claim 13, wherein the impingement hole is positioned and configured to deliver cooling circuit air to a predicted position of a hotspot on a surface of the airfoil.

15. A method of manufacturing an airfoil, the method comprising:
   determining a predicted position of a hotspot on a surface of the airfoil;
   interconnecting a skin core with a central core via an impingement core tie to define an impingement hole configured to direct cooling circuit air at the predicted position; and
   interconnecting the skin core with the central core via at least one structural core tie;
   wherein a first cross-sectional area of the impingement core tie is at least twice a second cross-sectional area of the at least one structural core tie.

16. The method of claim 15, wherein an impingement cross-sectional area of the impingement core tie is greater than about 25% of a cross-sectional area of the skin core.

17. The method of claim 16, wherein the impingement cross-sectional area of the impingement core tie is greater than about 50% of the cross-sectional area of the skin core.

* * * * *